A. E. WARD.
GEARLESS DIFFERENTIAL.
APPLICATION FILED JUNE 29, 1917.

1,254,180.

Patented Jan. 22, 1918.
3 SHEETS—SHEET 1.

INVENTOR
ALBERT E. WARD
BY W. S. Babcock
ATTY

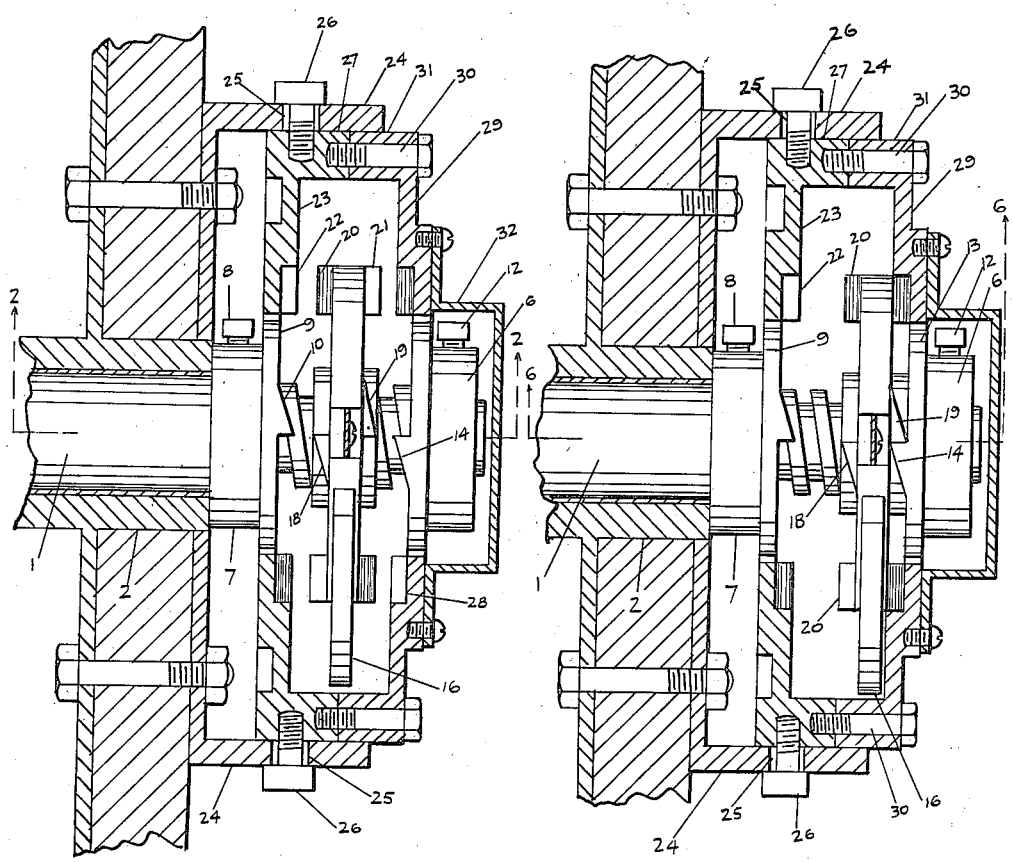

A. E. WARD.
GEARLESS DIFFERENTIAL.
APPLICATION FILED JUNE 29, 1917.

1,254,180.

Patented Jan. 22, 1918.
3 SHEETS—SHEET 3.

INVENTOR
ALBERT E. WARD
BY W. S. Babcock
ATTY.

UNITED STATES PATENT OFFICE.

ALBERT E. WARD, OF PALMER, SASKATCHEWAN, CANADA.

GEARLESS DIFFERENTIAL.

1,254,180.	Specification of Letters Patent.	Patented Jan. 22, 1918.

Application filed June 29, 1917. Serial No. 177,746.

*To all whom it may concern:*

Be it known that I, ALBERT E. WARD, a subject of the King of Great Britain, residing at Palmer, Saskatchewan, Canada, have invented new and useful Improvements in Gearless Differentials, of which the following is a specification.

The invention to be hereinafter described relates to a gearless differential.

In order to more clearly disclose the construction, operation, and use, of the invention reference should be had to the accompanying drawings forming part of the present application. Throughout the several figures of the drawings like reference characters designate the same parts in the several views.

In the drawings:—

Fig. 3 is a view similar to Fig. 1, showing the clutching members in elevation;

Fig. 4 is a view similar to Fig. 3, with clutch elements engaged;

Figures 1, 2:
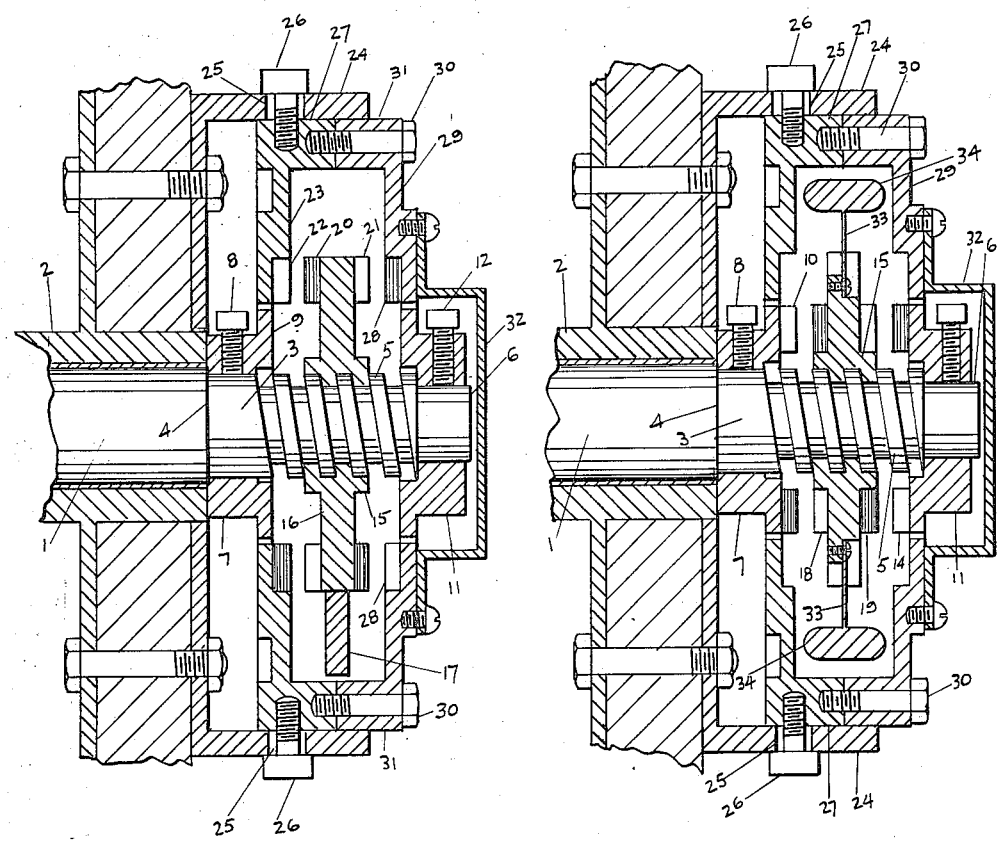
Figure 1 is a central vertical, longitudinal section, with the driven member running free.
Fig. 2 is a like view, at right angles to Fig. 1.
Figure 5:
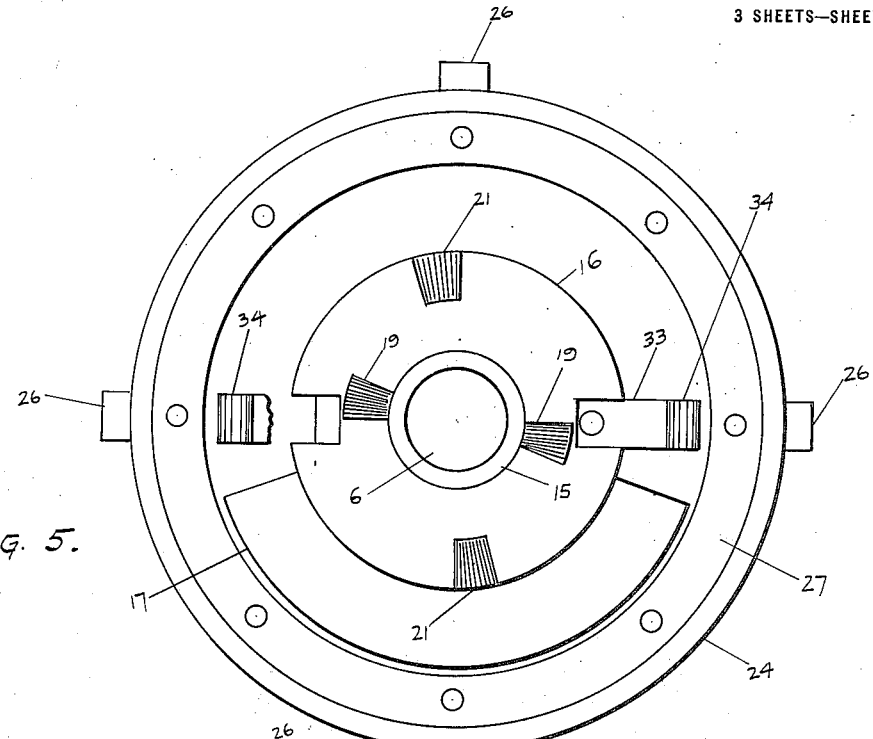
Fig. 5 is an end elevation, with outer clutch elements removed.

The main objects of the invention are to provide a simple, efficient, compact, durable, and economical gearless differential by which a wheel, pulley, or other rotatable member may be driven from an axle or other revoluble member. A further object is to provide means permitting the driven member to travel faster than the driving member, in case of necessity. A further object is to prevent accidental engagement between the clutch elements for reversing the drive, when the driving member is suddenly stopped while going at high speed. Further objects will appear from the following description and claims.

Referring to the drawings in detail, 1 indicates the axle or other driving means or member and 2 the hub of a wheel or other driven member freely revoluble thereon. That part of the driving member, extending beyond the hub, is reduced as at 3, providing a shoulder 4. From the reduced portion a heavy square thread 5 leads toward the outer end which is left unthreaded, as at 6. A collar 7 is secured to the driving member 1 by a set screw 8, threaded through the collar and binding against the reduced portion 3. This collar is provided with a flange or annular plate 9 provided with a pair of diametrically arranged, one-way, clutch members 10. A similar collar 11, is secured to the reduced end 6 by a set screw 12 and is provided with a flange or annular plate 13 provided with a pair of diametrically arranged, one-way, clutch members 14. But, the clutch members 14 are directed oppositely to the direction of clutch members 10, for reverse drive, as will later appear. It will be noticed that both collars are secured to the driving member and must rotate therewith. It will also be noticed that each clutch member has a tapered or inclined face in one direction, and a perpendicular face in the opposite direction, so that it is capable of driving only in one direction, but allows free running in the opposite direction. Arranged as above described, thread 5 extends between collars 7 and 11. Mounted on thread 5 is a floating nut 15 provided with an annular plate 16 and having its lower part heavily weighted as at 17, to prevent it from rotating with the driving member. The result is, that as the driving member 1 revolves in one direction or the other, thread 5 will cause the nut 15 to float toward or from one or the other of the two collars. Plate 16 is provided with two pairs of clutch members 18 and 19 similar to and coöperating with clutch members 10 and 14, respectively. Thus, as shaft 1 revolves in one direction, nut 15 will float along thread 5 until clutch elements 10 and 18 become engaged so that nut 15 will be driven by collar 7 and shaft 1. As soon as shaft 1 is started reversely, thread 5 floats nut 15 toward collar 11 until clutch elements 19 and 14 become engaged, driving nut 15 in the reverse direction.

To transmit the drives to the hub 2, pairs of clutch members 20 and 21 are provided on plate 16. These are similar to clutch members 10 and 14 but placed nearer the rim of the plate. One pair is designed for driving in one direction and the other in the opposite direction. Clutch members 20 are adapted to engage a coöperating pair of clutch members 22 on an annular plate 23 adjustably secured in a drum 24 which is solidly bolted or otherwise strongly secured to the hub 2. Adjustment of the drum is provided by elongate slots 25 in the drum wall, and bolts 26 playing therein and threaded into the flange 27 of plate 23. The width of each slot, of course, is just equal to the diameter of the bolt, as the only adjustment of the plate 23 is longitudinally, relatively to shaft 1 and the elements carried thereby.

Clutch members 21 are adapted to engage coöperating members 28 on an annular plate 29 provided with a flange 31 through which connecting bolts 30 are passed and threaded into the flange 27 of plate 23. This makes, practically, a single solid structure of the two plates 23 and 29, so that driving of either plate will drive the hub. The parts are so mounted and arranged, that clutch members 20 will engage clutch members 22 at the same time that clutch members 18 engage clutch members 10; and clutch members 21 will engage clutch members 28 at the same time that clutch members 19 engage clutch members 14. Consequently, when the clutch members 10 and 18, and 20 and 22 are engaged, hub 2 will be driven in one direction by shaft 1; and when the clutch members 14 and 19, and 21 and 28 are engaged, hub 2 will be driven in the reverse direction by shaft 1.

By adjustment of plates 23 and 29 in drum 24 they may be accurately positioned, longitudinally, relatively to flanges 9 and 13, as will be clear.

To plate 29 is secured a cap 32 which incloses the end of the driving member and collar 11, and acts as a lubricating chamber, or oil pot.

In the case of the front wheels of an automobile, one wheel will have to travel faster than the other in making a turn. The one-way clutch elements permit that, without difficulty, as will be clearly understood.

But, suppose, that shaft 1 and the wheel are revolving at a high speed, and shaft 1 is suddenly stopped but wheel hub 2 continues at its high speed. In such case, plate 16 will be spinning at a high speed, and the instant that shaft 1 stops, thread 5 will start it floating toward the opposite clutch members. The spinning power will be ample to carry the clutch members 19 into engagement with the clutch elements 14. As previously explained, this engagement is for reverse driving. Consequently, there would be a bad clash and, probably, bad breakage.

Figure 6:
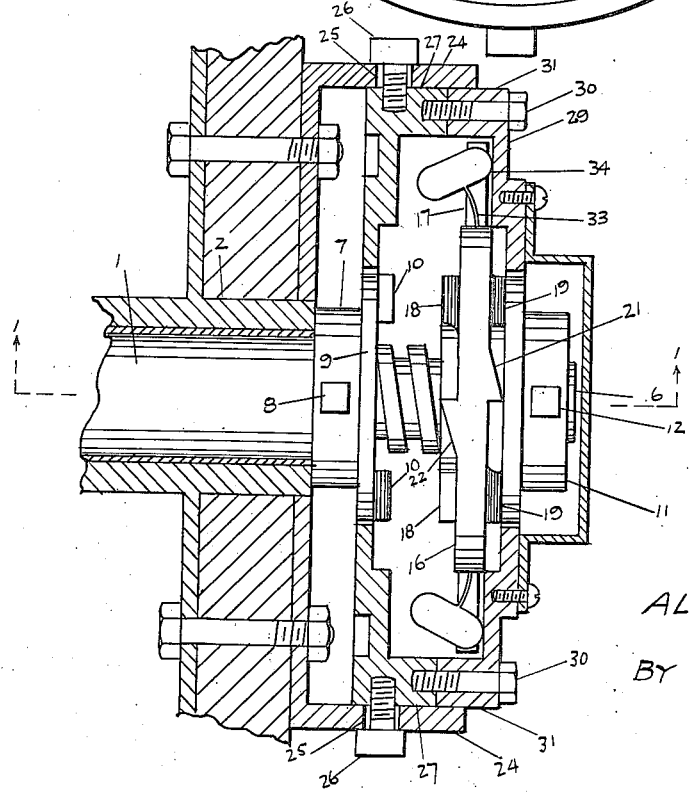
Fig. 6 is a view similar to Fig. 2, with clutch elements engaged and shown in elevation.

To avoid all possibility of any such clash, a retarding device has been provided. This consists of a pair of diametrically arranged leaf springs 33 extending radially from plate 16 and each having a head 34 adapted to engage plates 23 and 29. The length of heads 34 is such as to put springs 33 under appreciable tension when the plate 16 is in operative position for driving the hub in either direction, as shown in Fig. 6. But when the shaft 1 is not revolving, or revolving slower than hub 2, nut 15 and its plate 16 will be floated to inoperative position, as in Figs. 1, 2, and 3, and springs 33 will not be under tension. In the case of shaft 1 suddenly stopping, as above explained, the floating of nut 15 along thread 5, due to its spinning action, will be stopped by springs 33, before engagement of the clutch members, as will be readily understood.

By this arrangement and construction, positive forward and reverse drives are provided and a sudden stoppage of the driving shaft permitted.

It is thought that the construction, operation, and use of the invention will be clear from the preceding detailed description. Changes may be made in the construction, arrangement, and disposition of the several parts of the invention without in any way departing from the field and scope of the same, and it is meant to include all such within this application, wherein only a preferred form has been disclosed, by way of illustration.

Having thus described my invention, what I claim and desire to protect by Letters Patent is:—

1. A gearless differential of the character described comprising, a driving member, a driven member, a pair of spaced plates carried by said driven member and each provided with a pair of clutch members, a floating nut on said driving member and provided with a plate traveling between the aforesaid plates and having clutch members coöperating with the aforesaid clutch members and also having other clutch members, plates in radial alinement with the first mentioned plates and provided with clutch members adapted to coöperate with said other clutch members, means for securing said plates to the driving member, and means for floating said nut to operative position.

2. A gearless differential of the character described comprising, a driving member, a driven member, a pair of spaced plates carried by said driven member and each provided with a pair of clutch members, a floating nut on said driving member and provided with a plate traveling between the aforesaid plates and having clutch members coöperating with the aforesaid clutch members and also having other clutch members, plates in radial alinement with the first mentioned plates and provided with clutch members adapted to coöperate with said other clutch members, means for securing said plates to the driving member, means for floating said nut to operative position, and means for adjusting the first mentioned plates.

3. A gearless differential of the character described comprising, a driving member, a driven member, a pair of spaced plates carried by said driven member and each provided with a pair of clutch members, a floating nut on said driving member and provided with a plate traveling between the aforesaid plates and having clutch members coöperating with the aforesaid clutch members and also having other clutch members, plates in radial alinement with the first mentioned plates and provided with clutch members adapted to coöperate with said other clutch members, means for securing said plates to the driving member, means for floating said nut to operative position, and means for limiting the floating movement of said nut.

Signed at Gravelbourg, Saskatchewan, this 31st day of May, 1917.

ALBERT E. WARD.